United States Patent
Way et al.

(10) Patent No.: US 6,421,153 B1
(45) Date of Patent: Jul. 16, 2002

(54) DEVICE AND METHOD FOR DETERMINING PMD INDEPENDENT OF SOP

(75) Inventors: David Way, Garland; T. J. Xia, Richardson, both of TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/346,480

(22) Filed: Jul. 1, 1999

(51) Int. Cl.$^7$ .............................................. H04B 10/00
(52) U.S. Cl. ...................... 359/156; 359/110; 359/122; 359/161; 359/173; 359/195; 356/73.1
(58) Field of Search ................. 356/73.1; 359/110, 359/161, 173, 195, 158, 122

(56) References Cited

U.S. PATENT DOCUMENTS

| | | | |
|---|---|---|---|
| 5,311,346 A | * 5/1994 | Haas et al. | 359/156 |
| 5,473,457 A | * 12/1995 | Ono | 359/161 |
| 5,659,412 A | * 8/1997 | Hakki | 359/156 |
| 5,822,100 A | * 10/1998 | Robinson et al. | 359/161 |
| 5,930,414 A | * 7/1999 | Fishman et al. | 359/156 |
| 6,016,379 A | * 1/2000 | Bulow | 385/147 |
| 6,104,515 A | * 8/2000 | Cao | 359/161 |
| 6,271,922 B1 | * 8/2001 | Bulow et al. | 356/477 |

* cited by examiner

Primary Examiner—Leslie Pascal
Assistant Examiner—Hanh Phan

(57) ABSTRACT

A state-of-polarization (SOP)-independent device 226, 326 and method for determining polarization mode dispersion (PMD) in an optical communication system having an optical transmission line, including a detector 244, 344 coupleable to the optical transmission line, where the detector 244, 344 is capable of analyzing a pulse shape of an optical signal on the optical transmission line to determine PMD of the optical signal. A corrector 246, 346 may be coupled to the detector 244, 344, where the corrector 246, 346 is capable of compensating the optical signal for the determined PMD. A controller 242, 342 may be coupled to the detector 244, 344 and the corrector 246, 346. The pulse shape may comprise an eye diagram, which may contain a first peak and a second peak due to PMD, where the PMD determined by the detector 244, 344 is a function of the distance between the detected first and second peaks, which is indicative of a time delay between the detected first and second peaks. The device and method may also include a verifier 348 coupled to the corrector 246, 346, where the verifier 348 is capable of verifying that the corrector 246, 346 correctly compensated the optical signal for the PMD.

30 Claims, 5 Drawing Sheets

DEVICE AND METHOD FOR DETERMINING PMD INDEPENDENT OF SOP

TECHNICAL FIELD

This invention relates generally to optical communication systems, and more particularly to a device and method for accurately determining PMD of optical signals transmitted over a fiberoptic network.

BACKGROUND OF THE INVENTION

In a typical optical communication system, an optical signal in the form of a series of light pulses is emitted from an optical transmitter comprising a modulated laser diode. In the frequency domain, this signal comprises numerous frequency components spaced very closely about the nominal center frequency of the optical carrier, such as 193,000 GHz. As this type of modulated optical signal passes through an optical fiber, different frequency components of the optical signal travel at slightly different speeds due to an effect known as chromatic dispersion. In the course of an optical signal traveling through a very long fiber, such as 200 km, chromatic dispersion causes a single pulse of light to broaden in the time domain, and causes adjacent pulses to overlap one another, interfering with accurate reception. Fortunately, many techniques are known for compensating for chromatic dispersion.

Another form of dispersion is becoming a limiting factor in optical communication systems as progressively higher data rates are attempted. Polarization mode dispersion (PMD) arises due to birefringence in the optical fiber. This means that for two orthogonal directions of polarization, a given fiber can exhibit differing propagation speeds. A light pulse traveling through a fiber will probably, unless some control means are employed, have its energy partitioned into polarization components that travel at different speeds. As with chromatic dispersion, this speed difference causes pulse broadening and restricts the usable bandwidth of each optical carrier.

A modulated optical signal arriving at an optical receiver must be of sufficient quality to allow the receiver to clearly distinguish the on-and-off pattern of light pulses sent by the transmitter. Conventionally, a properly designed optical link can maintain a bit-error-rate (BER) of $10^{-13}$ or better. Noise, attenuation, and dispersion are a few of the impairments that can render an optical signal marginal or unusable at the receiver. Generally, when an optical channel degrades to a bit-error-rate of $10^{-8}$, a communication system will automatically switch to an alternate optical channel in an attempt to improve the BER.

One common method of analyzing the quality of a modulated optical signal is a so-called "eye diagram," shown in FIG. 1. The eye diagram consists of overlaying successive frames of time-domain traces of the optical signal, with each frame corresponding to one period of the nominal periodicity of the modulation. The vertical axis of an eye diagram represents instantaneous intensity (I) of the received signal, and the horizontal axis corresponds to time (T). Many successive traces of transmitted "ones" and "zeros" define a region or window within the middle of the display, defining the "eye diagram." On the time axis, the window is bound on either side by the transitional leading and trailing edges of the pulses. The eye diagram in FIG. 1 shows an optical signal 50, 52 traveling through the optical fiber. A large clear area or "window" in the center, such as the one shown in FIG. 1, with a single peak and no encroachment from any side, represents a good signal in that the presence or absence of a pulse during each clock cycle is clearly distinguishable.

Noise added to a signal appears as "fuzziness" of the lines defining the window. Sufficient noise can even obliterate the appearance of the window, representing a bad signal in that "ones" and "zeros" are no longer distinguishable. Impairments in the time axis, such as chromatic dispersion or polarization mode dispersion, cause the transitional areas of the display to close in upon the window from either side.

Active PMD compensation techniques are required in an optical communication system because the PMD of a given fiber varies over time due to the fiber aging, and due to temperature and pressure changes along the fiber. A fiber installed above ground can exhibit fairly rapid fluctuations in PMD due to temperature and mechanical forces (e.g. wind blowing the fiber). A fiber buried underground can be sensitive to loads such as street traffic or construction work. Also, the fiber may not have a perfect circular cross-section, causing varying delays of the polarization components.

In current optical communication systems, PMD changes are typically compensated for by a Polarization Mode Dispersion Compensator (PMDC) which detects the degree of polarization-dependent differential delay suffered by an optical carrier and then adaptively corrects the delay. As polarization characteristics of the fiber change, the PMDC constantly monitors and adjusts the signal in an attempt to minimize the PMD contribution to overall dispersion. A typical PMD compensator splits an incoming optical signal, intensity modulated by a data pulse stream, into two polarizations. The relative timing of the two signal halves is then corrected by introducing a delay into one signal half and then recombining the halves to form a corrected output signal.

Schemes to actively compensate for PMD generally involve detecting the presence of polarization-dependent timing differences and either a) applying delay elements to one or the other polarization to realign the timing of pulses or b) controlling the state-of-polarization (SOP) of the signal upon entry into the fiber, or at intermediate points along the fiber, such that birefringent effects are minimized or canceled out. Existing PMD compensators either include a state-of-polarization (SOP) detector and/or controller in order to feed a consistent polarization orientation into the beam splitter at the front end of the compensator, or rely on the use of one elsewhere in the optical communication system.

SUMMARY OF THE INVENTION

A problem of prior art PMD compensators is that they either assume SOP is not changing in the optical path, or utilize a SOP detector and/or controller to stabilize SOP by feeding a consistent polarization orientation into a beam splitter at the front end of the compensator, with the presumption that any residual SOP changes are caused by PMD. These assumptions are incorrect and cause flawed readings and unnecessary corrections of the optical signal to reduce PMD. These assumptions are incorrect because while changes in PMD cause changes in SOP, the converse is not necessarily true; SOP changes are not always caused by PMD. PMD is a separate phenomenon, distinguishable from SOP, where SOP can change dramatically and abruptly without a corresponding change in PMD. Thus, PMD is not being correctly compensated for in current optical transmission systems. More particularly, existing PMD compensator designs assume that SOP through a given optical path does not change appreciably over time, or that SOP can be controlled by a slow response SOP controller such that any residual SOP deviations are presumed attributable to PMD. This assumption is invalid, resulting in poor performance of existing PMD compensators. The present invention, an SOP-independent PMD detector, solves the problems of the prior art by providing a device and method of determining and compensating real-time PMD variations independently of SOP shifts.

The method and device of the present invention analyzes the pulse shape, for example, the eye diagram, of an optical signal on an optical transmission line to determine PMD. The amount of PMD calculated may then be compensated for. The PMD is observable on an eye diagram of an optical pulse stream suffering from PMD as two overlapping pulses, or peaks, with a saddle point in-between. The relative temporal offset, observable as the distance between the two peaks of the eye diagram, is indicative of and a measure of PMD. The SOP is seen on the eye diagram as a function of relative amplitude of the peaks, and advantageously, is not a factor taken into consideration when calculating and compensating for PMD in the present invention.

According to an embodiment of the present invention; disclosed is a state-of-polarization (SOP)-independent device for detecting polarization mode dispersion (PMD) in an optical communication system having an optical transmission line, including a detector coupleable to the optical transmission line, where the detector is capable of analyzing the pulse shape of an optical signal on the optical transmission line to determine PMD of the optical signal. A corrector may be coupled to the detector, where the corrector is capable of compensating the optical signal for the determined PMD. A controller may be coupled to the detector and the corrector. The pulse shape may be an eye diagram which may contain a first peak and a second peak, where the PMD determined by the detector is a function of the distance between the detected first and second peaks. The distance is indicative of a time delay between the detected first and second peaks, which time delay is indicative of first order PMD, also referred to as differential group delay (DGD). The controller may include a memory, and is capable of providing a clock signal to the detector. The device may further include a verifier coupled to the corrector, where the verifier is capable of verifying that the corrector correctly compensates the optical signal for the determined PMD. The corrector is capable of actively compensating the PMD by altering the optical signal as a function of the determined PMD, and the controller is capable of signaling the detector to request analysis of the optical signal.

According to another embodiment of the present invention, disclosed is a state-of-polarization (SOP)-independent device for detecting polarization mode dispersion (PMD) in an optical communication system having an optical transmission line, including a detector coupleable to the optical transmission line, where the detector is capable of analyzing an eye diagram of an optical signal on the optical transmission line to determine PMD of the optical signal. A corrector may be coupled to the detector, where the corrector is capable of compensating the optical signal for the determined PMD. A controller may be coupled to the detector and the corrector, and a verifier may be coupled to the corrector, where the verifier is capable of verifying that the corrector correctly compensates the optical signal for the determined PMD.

According to another embodiment of the present invention, disclosed is a method of detecting polarization mode dispersion (PMD) independent of state-of-polarization (SOP) in an optical communication system communicating an optical signal on an optical transmission line, the optical communication system having at least a detector. The method includes the steps of analyzing the pulse shape which may be an eye diagram of the optical signal using the detector to determine an amount of PMD of the optical signal. The optical signal may be compensated for the determined PMD using a compensator. The optical communication system may include a controller, and the method may further include the step of verifying that the optical signal is compensated correctly for the determined PMD. The method may also include the step of recompensating the optical signal for the determined PMD. Another optional step of this embodiment in which the controller includes a memory is to compare a first determined PMD value to a second determined PMD value, in order to determine whether the second PMD value equals zero or 100% of a pulse width of the optical signal.

The novel method and device for determining PMD independently of SOP provides the advantage of more accurately determining and compensating for PMD in an optical communication system. Improved transmission of optical signals over an optical fiber is provided with the present invention. A further advantage is that the requirement of the use of an SOP controller by either the optical communication system or the PMDC may be eliminated by the present invention, advantageous because of a reduction in the need for an element in the system. A further advantage is that changes in SOP of the optical signal do not affect the amount of PMD determined and compensated for by the system.

DETAILED DESCRIPTION OF PREFERRED EMBODIMENTS

The preferred embodiment of the present invention is discussed below in detail. However, it should be appreciated that the present invention provides many applicable inventive concepts which can be embodied in a wide variety of specific contexts. The specific embodiments discussed are merely illustrative of specific ways to make and use the invention and do not limit the scope of the invention.

Figure 1:
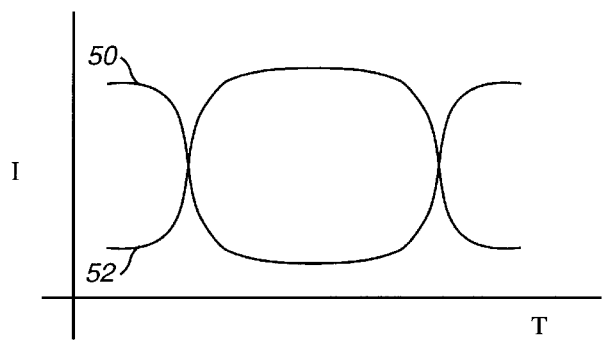
FIG. 1 illustrates an eye diagram for an optical signal on an optical fiber.
Figure 2:
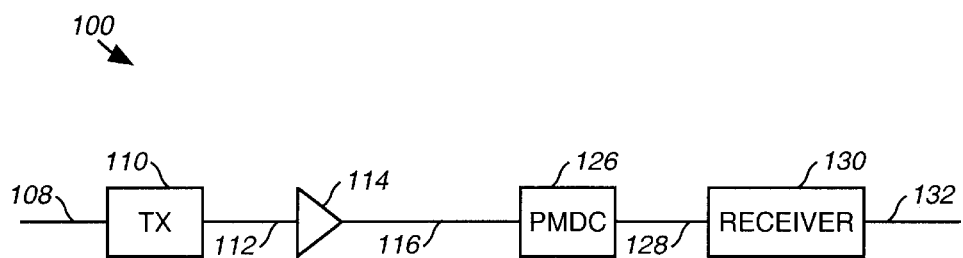
FIG. 2 illustrates a block diagram of an optical communication system 100 according to the present invention.

Referring first to FIG. 2, therein is illustrated a block diagram of an optical communication system 100 according to the present invention. System 100 includes an optical transmitter 110 including a semiconductor laser emitting light that is intensity modulated by a corresponding electrical high data rate data signal provided on input line 108. For example, the electrical data signal may be a SONET-compliant STS-48 or STS-192 synchronous data signal bearing digital data at about 2.5 GBPS or 9.9 GBPS, respectively. The intensity modulated optical carrier is provided by transmitter 110 onto optical fiber 112. For example, the optical carrier may be a SONET OC-48 or OC-192 signal bearing digital data at approximately 2.5 or 9.9 GBPS, respectively. The optical fiber 112 may include an optical amplifier shown at 114 for amplifying the optical carrier along the link thereof. If the links of the optical fiber 116 require additional optical amplifiers, such amplifiers may be placed along optical fiber 116 (not shown). As an optical signal travels through the optical communication system 100 over the optical fiber 112 and 116, the amplitude of the signal may decrease in proportion to the length of the optical fiber. Thus, there may be a requirement for multiple optical amplifiers throughout the optical communication system, for example, every 100 km along the optical link.

Transmitter 110 may include several semiconductor lasers, each providing light that is intensity modulated by a corresponding input electrical data signal to provide wavelength division multiplexing (WDM) if desired. For purposes of teaching and illustrating the present invention, a single semiconductor laser generating a single optical carrier is taught to discuss and describe the present invention with it being understood that the present invention can apply to each of several or all optical carriers being communicated over a common optical fiber.

Still referring to FIG. 2, optical system 100 also includes a Polarization Mode Dispersion Compensator (PMDC) 126 coupled to optical fiber 116, for example. As the polarization characteristics of the fiber change, the PMDC 126 constantly monitors the optical signal and adjusts the delay of one polarization component of the optical signal to minimize the PMD contribution to overall dispersion. The PMDC 126 is connected by optical fiber 128 to an optical receiver 130. The optical receiver 130 converts the optical signal to electrical digital data on output line 132 which is ideally identical to the input electrical digital data on input line 108.

In practice, one or several PMDC's 126 may be provided along the length of the optical fiber, and may be provided at several locations, including proximate the transmitters 110 for providing forward compensation, in the middle of the link of optical fibers 112, 116, proximate the receiver 130, or any combination thereof depending on the design of the electrical communication system. Thus, the location or number of PMDC's 126 may vary in the present invention. A problem in prior art optical communication systems is that the prior art PMDC's consider SOP information when analyzing and calculating the amount of PMD to be compensated. This results in an inaccurate assessment of PMD being calculated and thus being compensated for in the optical communication system. The result is a degraded optical signal lacking integrity, a problem which is amplified as the signal travels over the extended length of the optical fiber. The present invention solves these problems in the prior art by determining the PMD independent of SOP.

Figure 3:
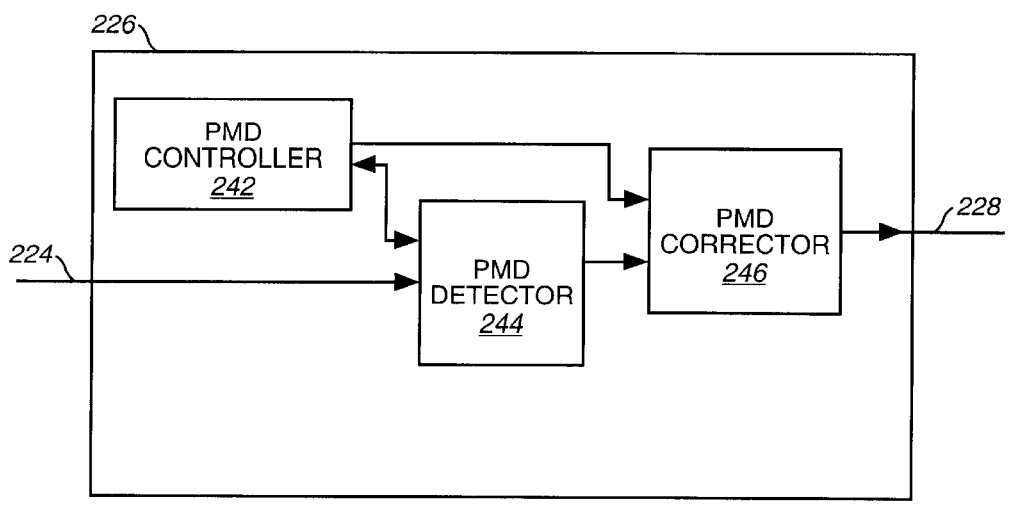
FIG. 3 illustrates a preferred embodiment of an SOP-independent PMDC 226.

Referring next to FIG. 3, therein is illustrated a preferred embodiment of the present invention, an SOP-independent PMDC 226 which may be used as the PMDC 126 in FIG. 2. PMDC 226 includes a PMD detector 244, capable of analyzing a pulse shape of an optical signal. The PMDC 226 includes a PMD controller 242 coupled to both PMD detector 244 and a PMD corrector 246. Optical fiber 224 containing an input optical signal is coupled to the input of PMD detector 244, and the output of PMD detector 244 may be coupled to the input of a PMD corrector 246. The output of PMD corrector 246 may be coupled to optical fiber 228 which contains the output signal of the PMDC 226.

The PMD controller 242 may also include a microprocessor or other device that continuously sends a clock pulse to the PMD detector 244. The clock pulse triggers the PMD detector 244 to generate and examine the pulse shape of the optical signal traveling on optical fiber 224. The clock pulse sent by the PMD controller 242 is preferably at 10 GHz or higher. The controller 242 preferably also has a memory function whereby one response from the detector 244 can be compared to the next response in order to detect changes in PMD in the optical signal.

Figure 4:
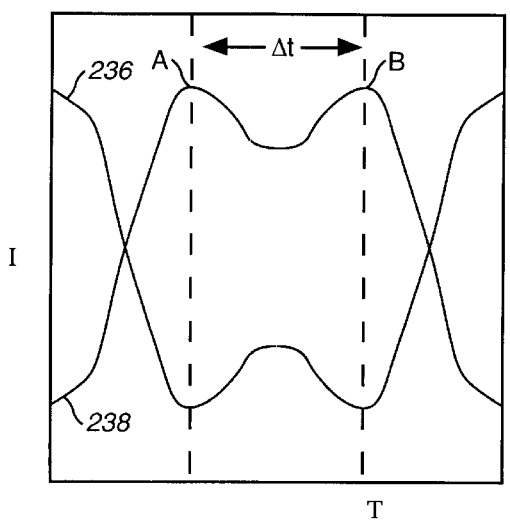
FIG. 4 illustrates a possible eye diagram having optical signals 236, 238 each with two peaks.

Upon receiving a clock signal requesting an examination of the pulse shape, PMD detector 244 analyzes the pulse shape of the optical signal and determines the amount of PMD. Referring now to FIG. 4, a pulse shape in the form of an eye diagram is shown having optical signal 236, 238, with two overlapping pulses (or peaks) A and B and a saddle point in-between them defined because of PMD in the optical signal. The relative temporal offset of the two observed pulses visually identified by the distance between the two peaks A and B, shown as Δt, indicates the amount of PMD on the optical signal 236, 238. This temporal offset is measured by the PMD detector 244. For example, the optical signal 236, 238 may have a frequency of 10 GHz with pulses 100 ps apart and a value of Δt may be 10 ps.

Figure 5:
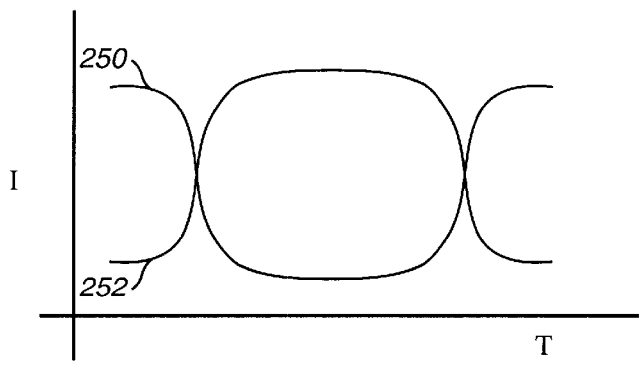
FIG. 5 shows an eye diagram with corrected optical signals 250, 252.

Referring again to FIG. 3, the PMD detector 244 communicates the amount of PMD calculated to the PMD controller 242. PMD controller 242 signals the PMD corrector 246 to correct the optical signal 236, 238 to compensate for the amount of PMD calculated by the PMD detector 244. The PMD corrector 246 then compensates or adjusts the signals 236, 238 to provide the corrected optical signal 250, 252 on optical fiber 228 with no PMD as shown in the eye diagram of FIG. 5.

Note that if the eye diagram has only one peak, Δt is equal to zero. This possibly means that the amount of PMD is equal to zero, and no compensation is required. However, an eye diagram with only one peak and a Δt equal to zero could also mean that the amount of PMD is equal to 100% of a pulse width, leading to an incorrect reading and improper compensation for PMD. This problem is preferably solved by controller 242 having a memory function, allowing the controller 242 to compare current readings of PMD to a previous PMD reading, and recognize when a PMD is changing and approaching from 99% towards 100% of a pulse width, or approaching from 1% to 0% of a pulse width, or PMD of zero, for example.

Figure 7:
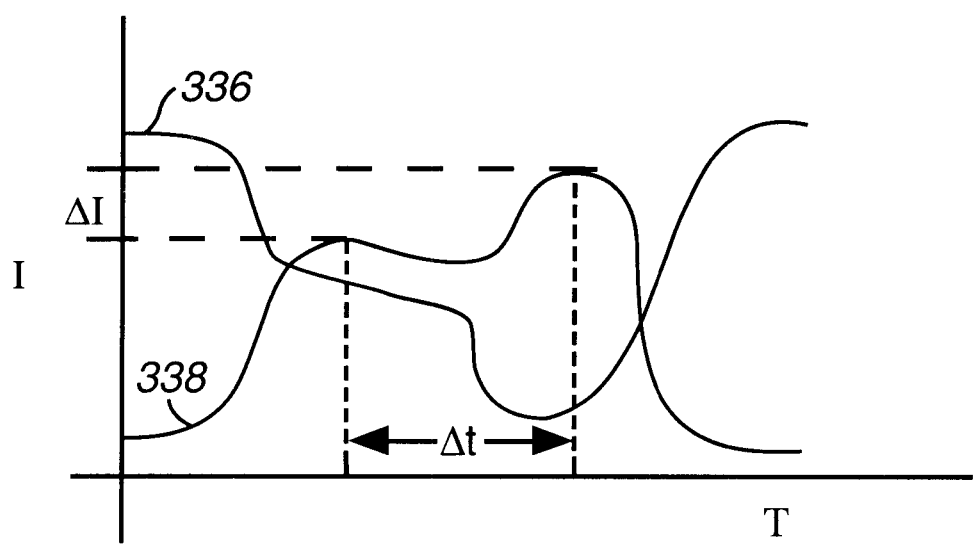
FIG. 7 shows a possible eye diagram of optical signals 336, 338 on optical fiber 324 as it enters the PMDC 326 in FIG. 6.

SOP will be reflected in an eye diagram such as the one shown in FIG. 7 by a fluctuation or shift in relative amplitude between earlier and later pulses, such as a fluctuation in amplitude of the signals 236, 238. However, in FIG. 4, no SOP is noticeable because the amplitudes of the two peaks A and B are approximately equal. FIG. 7 shows an example of SOP indicated by the difference in peak amplitudes, ΔI. An advantage of the present invention is that in examining the pulse shape, or eye diagram, the amount of SOP is not considered in determining the PMD, because a fluctuation in the relative amplitude of the signals 236, 238 does not affect the value of Δt which is indicative of the PMD. Therefore, the PMD is determined and may be compensated for independent of SOP, resulting in a more accurate PMD detection and compensation.

Figure 6:
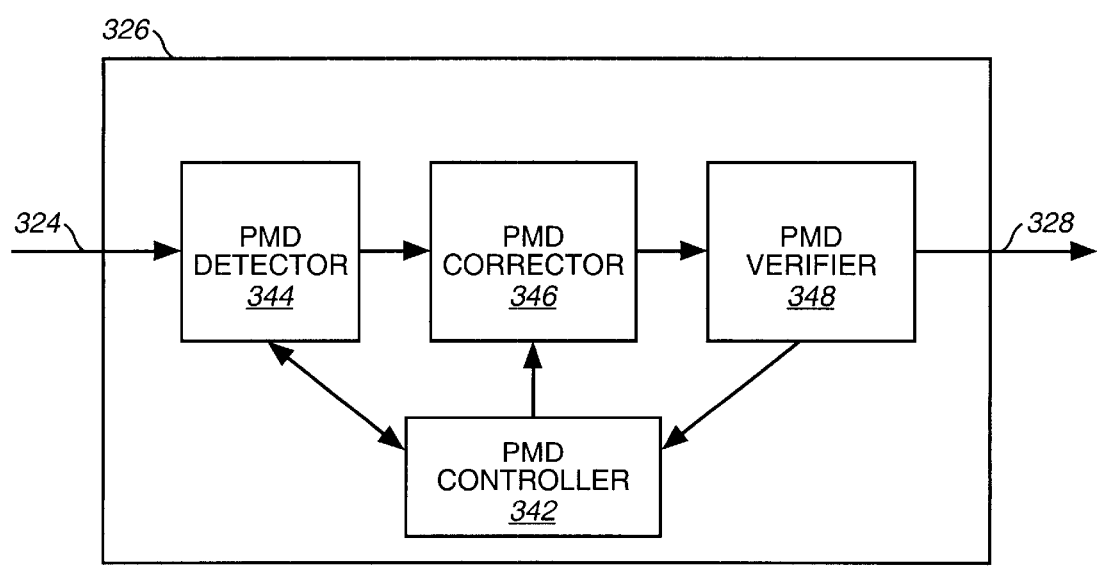
FIG. 6 shows an alternate embodiment of an SOP-independent PMDC 326.

An alternate embodiment of the present invention is illustrated in FIG. 6. The SOP-independent PMDC 326 (which may be used as PMDC 126 in FIG. 2) includes a PMD detector 344, and a PMD corrector 346, a PMD verifier 348, and a PMD controller 342. The PMD detector 344 is coupled to an optical fiber 324 containing an input optical signal. The PMD detector 344 is coupled to the PMD corrector 346 and the PMD controller 342. The PMD controller 342 is coupled to the PMD corrector 346 and to the PMD verifier 348. The PMD corrector 346 is coupled to the PMD verifier 348 which is coupled to an optical fiber 328 containing the output optical signal. This embodiment includes an additional element of a PMD verifier 348 which examines the optical signal emerging from PMD corrector 346 and verifies that the correct amount of PMD has been compensated for by the PMD corrector 346. If an incorrect value of PMD has been compensated for, the PMD verifier 348 signals the PMD controller 342 to adjust the compensation of the optical signal before it leaves the PMDC 326. The verifier may repeat the verification step until the PMD has been adequately eliminated from the optical signal.

Figure 8:
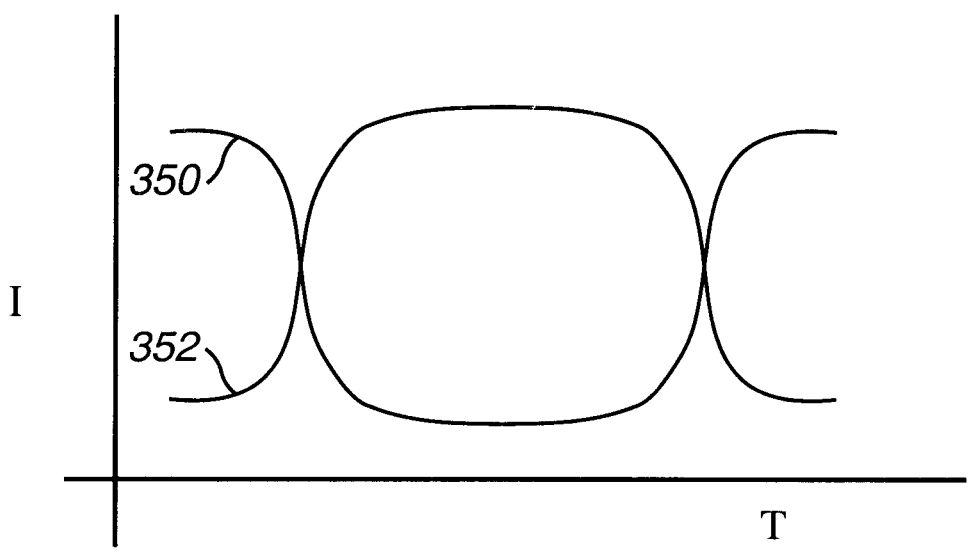
FIG. 8 shows a corrected eye diagram of optical signals 350, 352 after being compensated by the PMDC 326 of FIG. 6.

FIG. 7 shows a possible eye diagram of an optical signal 336, 338 on optical fiber 324 generated by PMD detector 344. As shown in FIG. 7, the amplitudes of the two peaks may not be equal, with the difference between the peaks $\Delta I$ being an indication of the SOP, while $\Delta t$ indicates the PMD of the optical signal independent of SOP. FIG. 8 shows a corrected eye diagram of optical signal 350, 352 on optical fiber 328 after being compensated for by the PMDC 326 of the present invention.

Figure 9:
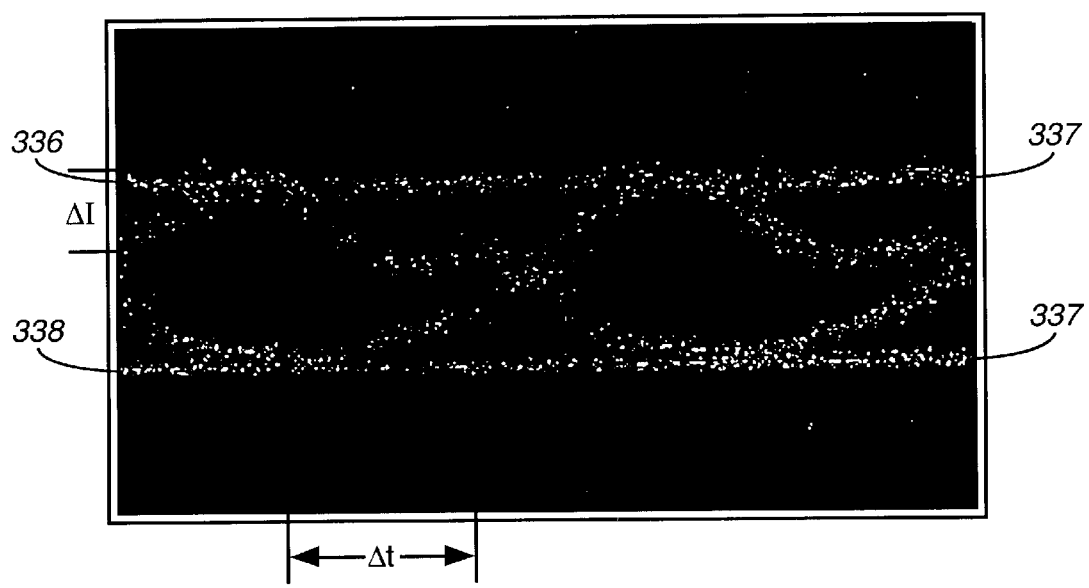
FIG. 9 illustrates an actual image of an eye diagram from the monitor of an oscilloscope observing an optical carrier, with the amount of PMD indicated by $\Delta t$.

FIG. 9 illustrates an actual view of an eye diagram visible from the monitor of an oscilloscope monitoring the optical carrier. The top and bottom horizontal lines 337 reflect NRZ, or non-return to zero which are not important for the current invention. Signals 336, 338 indicate an eye diagram of an optical signal transmitted along an optical fiber, having PMD of about 60 ps DGD (differential group delay), first order PMD, determinable by the time interval between the two peaks, $\Delta t$. The SOP is determinable by the difference in amplitudes of the two peaks, $\Delta I$.

The novel method and system of determining PMD independently of SOP provides the advantage of more accurately determining and compensating for PMD in an optical communication system. Improved transmission of optical signals over an optical fiber is provided with the present invention. A further advantage is that use of an SOP controller by either the optical communication system or the PMDC may be eliminated by the present invention, which reduces the need for an element in the system. A further advantage is that changes in SOP of the optical signal do not affect the amount of PMD determined and compensated for by the system.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the PMD detector 244, 344 may comprise a separate auxiliary threshold circuit that is used to sample various time and amplitude threshold set points. By proper control of the auxiliary threshold circuit, the shape of the eye diagram can be probed, providing data that can be analyzed according to the device and method of the present invention disclosed herein. Also, the device and method of the present invention is preferably implemented in hardware, but could be implemented in software if desired. It is therefore intended that the appended claims encompass any such modifications or embodiments.

What is claimed is:

1. A device for determining polarization mode dispersion (PMD) in an optical communication system having an optical transmission line, comprising:
   a detector connected to the optical transmission line comprising an analyzer means for analyzing a pulse shape on an eye diagram representing an optical signal on the optical transmission line and a PMD determining means for determining the PMD of the optical signal.

2. The device of claim 1, wherein the pulse shape has a first peak and a second peak and wherein the PMD determined by the detector is a function of a time delay between the first and second peaks.

3. The device of claim 2, wherein the time delay indicated by a distance is between the first and second peaks on the eye diagram.

4. The device of claim 1 further comprising a corrector responsively coupled to the detector, wherein the corrector compensates for the determined PMD in the optical signal.

5. The device of claim 4, wherein the corrector is capable of compensating for the PMD by altering the optical signal as a function of the determined PMD.

6. The device of claim 4 further comprising a controller coupled to the detector and the corrector.

7. The device of claim 6, wherein the controller signals the detector to request analysis of the optical signal.

8. The device of claim 6, wherein the controller comprises a memory, wherein a first determined PMD value is stored from a first pulse of the optical signal and a second determined PMD is stored from a second pulse of the optical signal, wherein the controller compares the first determined PMD value to the second determined PMD value to determine whether the second PMD value equals zero or 100% of a pulse width of the optical signal.

9. The device of claim 6 further comprising a verifier coupled to the corrector, wherein the verifier determines whether the corrector correctly compensates the optical signal for the determined PMD.

10. A device for detecting and compensating polarization mode dispersion (PMD) in an optical communication system having an optical transmission line, comprising:
    a detector coupleable to the optical transmission line, wherein the detector analyzes a pulse shape on an eye diagram representing an optical signal on the optical transmission line to determine PMD of the optical signal; and
    a corrector coupled to the detector, wherein the corrector compensates the optical signal for the determined PMD.

11. The device of claim 10, wherein the detector analyzes calculations of an eye diagram having a first peak and a second peak, wherein the PMD determined by the detector is a function of the distance between the first and second peaks on the eye diagram.

12. The device of claim 11, wherein the distance is indicative of a time delay between the first and second peaks.

13. The device of claim 10 further comprising a controller coupled to the detector and the corrector, wherein the controller signals the detector to analyze the optical signal.

14. The device of claim 13, wherein the controller comprises a memory, wherein a first determined PMD value is stored from a first pulse of the optical signal and a second determined PMD is stored from a second pulse of the optical signal, wherein the controller is capable of comparing the first determined PMD value to the second determined PMD value to determine whether the second PMD value equals zero or 100% of a pulse width of the optical signal.

15. The device of claim 14 further comprising a verifier coupled to the corrector, wherein the verifier determines whether the corrector correctly compensates the optical signal for the determined PMD.

16. A method of determining polarization mode dispersion (PMD) independent of the state-of-polarization (SOP) in an optical communication system communicating an optical signal on an optical transmission line, the optical communication system comprising a detector, the optical signal having a pulse shape, the method comprising the step of:

analyzing the pulse shape on an eye diagram representing the optical signal to determine an amount of PMD of the optical signal.

17. The method of claim 16 wherein the eye diagram comprises a first peak and a second peak, wherein the step of analyzing the eye diagram comprises measuring the distance between the first peak and the second peak to determine PMD.

18. The method of claim 17, wherein the distance measured is a function of a time delay between the analyzed first and second peaks.

19. The method of claim 16, wherein the optical communication system comprises a compensator, further comprising the step of compensating the optical signal for the determined PMD using the compensator.

20. The method of claim 19 further comprising verifying that the optical signal was compensated correctly for the determined PMD.

21. The method of claim 20 further comprising step of recompensating the optical signal for the determined PMD.

22. The method of claim 16, wherein a first determined PMD value is stored from a first pulse of the optical signal and a second determined PMD is stored from a second pulse of the optical signal; further comprising the step of comparing the first determined PMD value to the second determined PMD value.

23. The method of claim 22 further comprising the step of analyzing the first PMD value and the second PMD value to determine whether the second PMD value equals zero or 100% of a pulse width of the optical signal.

24. A device for determining polarization mode dispersion (PMD) in an optical communication system having an optical transmission line comprising:

a detector connected to the optical transmission line wherein said detector analyses a pulse shape of an eye diagram representing an optical signal on the optical transmission line and said detector determines the PMD of the optical signal.

25. The device of claim 24, wherein the pulse shape has a first peak and a second peak and wherein the PMD determined by the detector is a function of a time delay between the first and second peaks.

26. The device of claim 25, wherein the time delay indicated by a distance is between the first and second peaks on an eye diagram.

27. The device of claim 24 further comprising a corrector responsively coupled to the detector, wherein the corrector compensates for the determined PMD in the optical signal, wherein the corrector is capable of compensating for the PMD by altering the optical signal as a function of the determined PMD.

28. The device of claim 27 comprising a controller coupled to the detector and the corrector, wherein the controller signals the detector to request analysis of the optical signal.

29. The device of claim 28, wherein the controller comprises a memory, wherein a first determined PMD value is stored from a first pulse of the optical signal and a second determined PMD value is stored from a second pulse of the optical signal, wherein the controller compares the first determined PMD value to the second determined PMD value to determine whether the second PMD value equals zero or 100% of a pulse width of the optical signal.

30. The device of claim 27 further comprising a verifier coupled to the corrector, wherein the verifier determines whether the corrector correctly compensates the optical signal for the determined PMD.

* * * * *